United States Patent [19]

Vezirian

[11] Patent Number: 4,620,803
[45] Date of Patent: Nov. 4, 1986

[54] FRICTION BEARING COUPLE

[76] Inventor: Edward Vezirian, 110 Firwood, Irvine, Calif. 92714

[21] Appl. No.: 759,238

[22] Filed: Jul. 26, 1985

[51] Int. Cl.$^4$ ............................................. F16C 17/10
[52] U.S. Cl. ...................................................... 384/93
[58] Field of Search .................. 384/93, 95, 291, 292, 384/371, 372; 175/371

[56] References Cited

U.S. PATENT DOCUMENTS

| 1,731,790 | 10/1929 | Payne | 384/292 |
| 4,232,912 | 11/1980 | Williamson | 384/93 |
| 4,248,485 | 2/1981 | White et al. | 384/95 |

Primary Examiner—Lenard A. Footland

[57] ABSTRACT

A friction bearing is disclosed, intended for very heavy duty use, for example, as in rotary cone rock bits.

In a pair of structural members having cooperating load bearing surfaces, one such cooperating surface is interrupted by a fine grid of small grooves formed therein to retain lubricant and to produce, over the total bearing surface, the turbulent hydraulic environment normally found only along the line of formation of a hydro-dynamic lubricant film. An extension of the useful life expectancy of the bearing is claimed by thus postponing degradation of the bearing surfaces by metal transfer therebetween due to failure of the hydro-dynamic lubricant film.

2 Claims, 5 Drawing Figures

FRICTION BEARING COUPLE

BACKGROUND OF THE INVENTION

1. Field of the Invention

This invention pertains to improvements in heavy duty friction bearings. More particularly, this invention is directed toward improvement in the design and method of producing such bearings for demanding service, for example, as in rotary cone rock bits and the like.

2. Summary of the Prior Art

Many friction bearing designs are intended to be unidirectional, used to bear loads predominantly or exclusively in one direction. The "unloaded" side is then frequently used to reservoir lubricant in position as required to produce the hydro-dynamic lubricant film which bears the load on the remaining bearing area. Such designs are predominant in the cited example of the rotary cone rock bit.

One such bearing is described in U.S. Pat. No. 3,995,917 by Quinlan. In production, most of the length of the radial bearing shaft is undercut in relief. Subsequently, the "loaded" side is filled with arc deposited stellite which is then ground to the finished diameter. The unloaded and unfilled side provides a ready storage location for lubricant. The cooperating bore of the rotary cutter is undercut in a similar manner and filled with arc deposited aluminum bronze which is subsequently ground to diameter.

In a competing design, the unloaded side of the journal shaft is relieved for the storage of lubricant by means of an eccentric grinding operation. The shaft is used hardened and ground.

Yet another popular design features a hard metal filled relief on the loaded side of the journal shaft which is then ground full round. This bearing supports a matching bore with a composite surface. In production this bore is relieved longitudinally in narrow strips leaving unrelieved lands of similar dimension between. The reliefs are subsequently filled with arc deposited soft bearing metal, and the bore then ground to size. While the hard steel lands resist wear and support the load, the soft bars aid in load support and also serve to trap detritus by embedding it, thus slowing the degradation rate of the bearing.

Another bearing surface of similar nature with a unique method of production has been patented in this country, but is not practiced commercially. The steel bearing surface is deeply knurled, and subsequently overcoated with a fused deposit of softer bearing alloy. The bearing is then ground to size, producing a surface of small work hardened diamond shaped areas of steel within a grid of soft bearing alloy.

Another commercial rock bit bearing uses a split floating bushing of beryllium copper, or other bearing alloy, running between hardened steel bearing surfaces.

Rock bits are typically used until some part fails. Ideally, the bearings hold up till the cutting teeth wear out, and the bit may then be withdrawn without leaving metal parts in the well bore. Bearing failures are not uncommon, however, sometimes resulting in the down hole loss of rotary cones. A need exists, therefore, for further improvement in the bearing systems of rock bits aimed at lengthening the reliable life expectancy of such bearings in service.

The production of fine finishes and close running fits are important considerations in service longevity, not well supported by such practices as relieving the unloaded side of the supported by such practices as relieving the unloaded side of the bearing, or by the use of a floating bushing which also serves to double the running clearances. A bushing of any type gives a wider choice of materials with which to produce a long running bearing couple, but bushings also use up premium radial space which is a contraindication to their use in rock bits.

Another important area for improvement is in the nature of materials used in the construction of such bearings. Materials which are arc deposited are less than ideal choices being metalurgically non-homogeneous and of disordered microstructure.

SUMMARY OF THE INVENTION

An object of this invention is to provide an improved friction bearing couple between two relatively moving and mutually cooperating load bearing structural members.

Another object of this invention is to provide a heavy duty friction bearing with an extended service life expectancy through improved lubrication means.

Both the journal shaft and the rotary cone of a typical rock bit are of heat treated steel. In the practice of this invention, a thin bushing or thrust plate is metalurgically clad to one steel member and subsequently finished to size to fit the cooperating member. In this way the proper bearing couple is provided without resorting to a loose or floating member. The cladding operation may be accomplished by any appropriate means, for example by brazing. Being supported over its entire area by the steel member, the finished cladding material need be no thicker than required by such considerations as wear and accuracy of the component parts. It should be noted that very little of the bearing surface wears away prior to bearing failure, and thus very little of the scarce space within a rotary rock cutter cone need be occupied by such a bearing.

Ideally the loads in a friction bearing are borne by processes within a thin film of lubricant which isolates the bearing surfaces from moving metal to metal contact. This ideal hydro-dynamic lubricant film is dynamically generated forms between relatively moving eccentric bearing surfaces when lubricant being turbulently dragged into the wedge of space approaching the loaded portion of the bearing is squeezed to a minimum film thickness characteristic to that lubricant. In a properly designed bearing/lubricant system, that characteristic film thickness approximates the concentric bearing clearance. The dynamics of the lubricant film are generated by the eccentricity of location of the shaft member within its running clearance.

A friction bearing kept lubricated hydro-dynamically and running within its design limits could have an indefinitely long life expectancy. Wear and surface degeneration arise from failure of the hydro-dynamic lubricant film which allows dynamic metal to metal contact between bearing surfaces. Frictional heat generated by such contacts causes instantaneous pinpoint welding and weld breaking between the bearing surfaces resulting in a transfer of metal particles from one surface to the other and consequently an interruption in the original surface finishes. Once this process starts, it progresses at a pyramiding rate resulting in the ultimate destruction of the bearing as a load carrying device.

Certain operating conditions are known to be antagonistic to such lubricant film failures; excessive load, shock load, erratic load, high temperature, lack of or deterioration of lubricant, or slow, reciprocal, or erratic motion. In some difficult bearing applications, for example in a friction bearing rotary cone rock bit, all of these operating conditions may be normal.

Lubricant being dragged into a loaded zone of the bearing is subjected to an increase in hydraulic pressure due to a reduction in the running clearance within the loaded zone resulting from the load induced eccentricity of location between the two bearing surfaces. Of course the location of the loaded zone in a particular bearing may change suddenly, frequently, or even continually, but, under controlled constant operating conditions, it has been observed that film failures do not occur in those regions of increasing pressure wherein the lubricant film is being generated, but failures do occur in regions of falling pressure. Generally then such failures occuring under nominal conditions are of little consequence being at locations within larger running clearances and under little or no load.

Many bearing designs, outside of rock bits, feature lubricant distribution grooves formed with one bearing surface, usually as part of a pressurized lubricant distribution system, however the edges of these grooves also serve to establish or to maintain hydro-dynamic lubricant films between the relatively moving bearing surfaces.

Study of the film forming processes found along the active edge of a lubricant distribution groove reveals that hydraulic pressure piling up along that edge provides substantial "bearing capacity" in an area of the groove very near the active edge.

It has been found that a fine grid of small grooves formed within one bearing surface can make the entire treated surface behave as a turbulent film generator. Thus lubrication can be made totally turbulent instead of hydro-dynamic. Given sufficient lubricant then, lubrication failures may be postponed until wear substantially increases the running clearance of the bearing.

The dimensional proportions of the grid system have well defined limits, and within these limits, up to about 50% of the grooved bearing surface may be devoted to grooves without substantially reducing the capacity of the bearing.

The features of the present invention, which are believed to be noval, are set forth with particularity in the appended claims. The present invention, both as to its organization and its manner of operation, together with the further advantages thereof, may best be understood by reference to the following description taken in connection with the accompanying drawings.

DESCRIPTION OF THE PREFERRED EMBODIMENT

Figure 1:
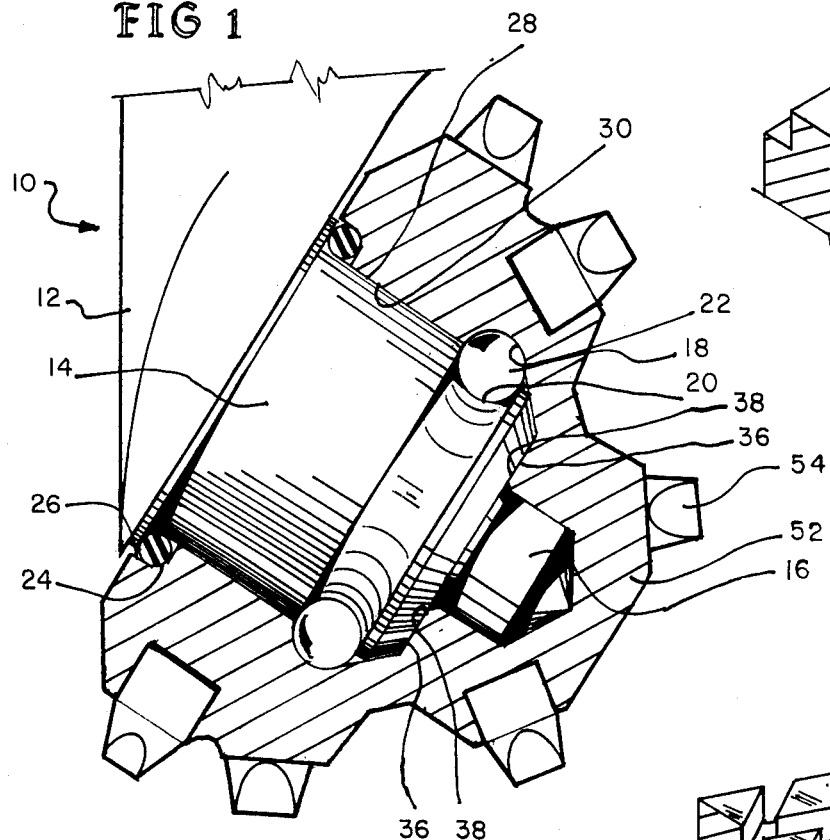
FIG. 1 is a sectional view through the rotary cone and journal portion of a representative rock bit showing and identifying the various parts thereof in their interrelationships.

Referring now to the drawings, FIG. 1 illustrates the bearing detail, in section, of a representative rock bit. The relatively stationary shaft portion of the assembly, generally indicated as 10, comprises the downwardly extending supporting leg 12, the cantilevered journal shaft 14, and the pilot spindle 16. Bearing balls 18, captured in a toroidal space defined by the journal ball race 20 and the cone ball race 22, bear thrust loads which are directed away from the supporting leg 12 thus retaining the rotating cone 52 in position on the journal shaft 14. Elastomeric seal 24 housed in counterbore 26 retains lubricant within the bearing space and excludes foreign matter. The rotary cone 52, with rock cutting teeth 54, is rotatively supported by the primary radial bearing surfaces 28 and 30, and supported by the primary radial bearing surfaces 28 and 30, and the secondary radial bearing surfaces 32 and 34. Thrust loads directed towards the supporting leg 12 are borne by the primary thrust bearing surfaces 36 and 38.

It is optional, in any case, whether to grid the bearing surface of the shaft or the bearing surface of the housing member, the result is the same. Production considerations may influence the choice.

Figure 3:
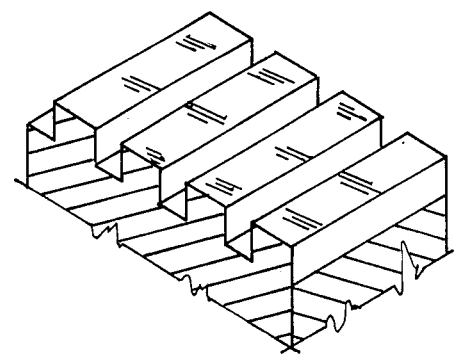
FIG. 3 illustrates one gridding pattern, enlarged for clarity.
Figure 2:
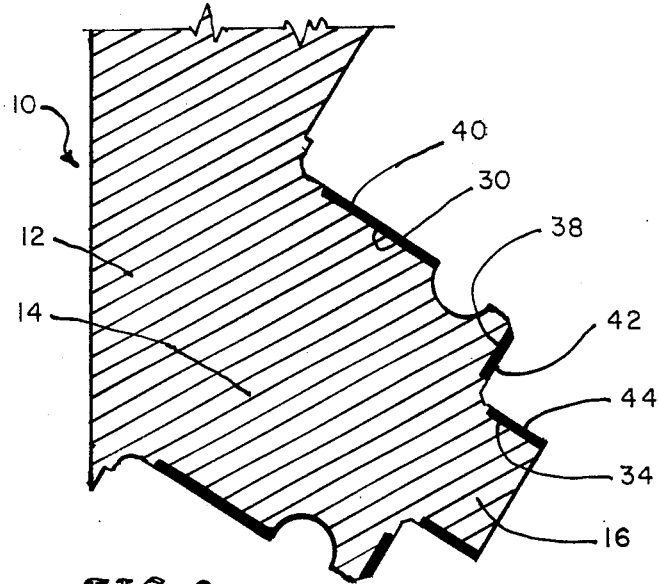
FIG. 2 is a partial view of the supporting journal shaft portion of FIG. 1, illustrating the cladding detail of one embodiment of the invention.

An enlarged portion of bearing surface is illustrated in FIG. 3, depicting a grid pattern of simple parallel grooves, which, to be effective as lubricant film generators, are oriented in a direction that does not parallel the travel of the cooperating bearing surface.

Figure 4:
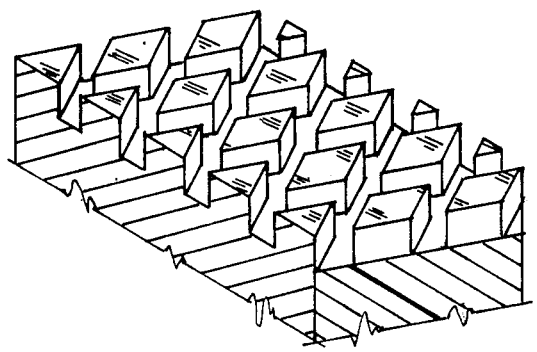
FIG. 4, like FIG. 3, illustrates another gridding pattern.

A cross-hatched grid pattern is illustrated in FIG. 4, and may be useful in the secondary roll of axial lubricant redistribution.

In the case of a thrust bearing surface, the grid pattern must have a polar rather than a coordinate design, in order that the non-parallel restriction on relative motion be met, or else only part of the gridded surface would be effective.

Figure 5:
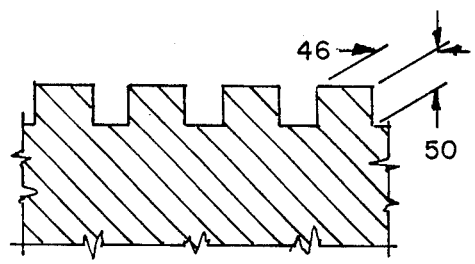
FIG. 5 represents a section taken through a gridded member identifying the various dimensions described.

Referring now to FIG. 5, the groove is defined by its width 46 and its depth 50. The land between grooves is defined only by its area, because the land represents original bearing surface and is thus two dimensional. The length of either groove or land is determined by grid pattern and bearing size and thus requires no definition.

In depth, the grooves are preferred to be from about 0.005 inch to about 0.010 inch. Grooves of 0.005 depth are considered to be useful for moderate duty, providing for less wear before becoming ineffective. Grooves more than 0.010 inch deep cause loss of dynamic load capacity in the bearing.

In width, the grooves are preferred to be from about 0.008 inch to about 0.028 inch, measured in the direction of relative motion of the cooperating bearing surface. Grooves less than 0.008 inch are inefficient as lubricant film generators, and grooves more than about 0.028 wide reduce the dynamic load capacity of the bearing.

The grooves cover a total composite area equal to from about 18 percent of the total gridded surface to about 48 percent of the total gridded surface. This specification controls the area of the lands based on the size of the grooves.

The method used to produce the lubricant grooves is not critical, and may be, for example, photo chemical milling, precision knurling, or air-abrasive machining.

It is reasonable to assume that a given friction bearing is initially both static and loaded, and therefore metal to metal contact exists between the cooperative bearing surfaces. At the onset of relative motion lubricant is adhesively dragged by the moving bearing surface into the wedge shaped space to one side of the loaded zone causing a linear pressure wave extending across the length of the bearing. This linear pressure wave forces the shaft member bearing surface away from contact with the housing member bearing surface, and a hydrodynamic lubricant film is established between those bearing surfaces.

In the case of the gridded bearing herein described, each groove cutting across the path of the moving bearing surface generates its own linear pressure wave of lubricant. The wedge shaped space described above still exists and is still operative in the same way as in the ungridded bearing. In the gridded bearing, however, the entire surface of the bearing is supplied with linear pressure waves of lubricant which serve to stabilize the shaft member toward a concentric position with regard to the housing member, and to resist the processes which tend to rupture the lubricant film.

The choice of lubricant for use with this bearing is no less critical than it is for any other bearing. Any bearing must work in cooperation with its lubricant. The gridded feature requires a lubricant free of fibered or particulate matter. Such materials serve beneficial purposes in some bearings, but serve only to choke and foul the fine grid system if used in the lubricant of the gridded bearing.

This gridded bearing reservoirs lubricant over its total surface area, and might be likened therefore to the oil filled porous metal type of bearing. The porous metal bearing, however, is structurally soft and thus capable of only relatively light duty.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. In a rotary cone rock bit, a heavy duty friction bearing couple comprising:
    a first structural member forming thereon a first load bearing surface,
    a second structural member forming thereon a second load bearing surface adapted for mutual cooperation with said first load bearing surface to support relative motion therebetween, and
    a fine grid of lubricant grooves formed by one of said load bearing surfaces thereon, said lubricant grooves being from about 0.005 inch to about 0.010 inch in depth, and said lubricant grooves being from about 0.008 inch to about 0.028 inch in width as measured in the direction of relative motion of said load bearing surfaces.

2. The invention as described in claim 1 wherein said lubricant grooves cover from about 18 percent to about 48 percent of the area of said gridded surface.

* * * * *